United States Patent [19]

Kutateladze et al.

[11] 4,236,091

[45] Nov. 25, 1980

[54] ELECTRICAL MACHINE WITH CRYOGENIC COOLING

[76] Inventors: Samson S. Kutateladze, ulitsa Zolotodolinskaya 9, kv. 14; Mark O. Lutset, ulitsa Tereshkovoi, 8, kv. 151; Anatoly G. Korolkov, ulitsa Ivanova, 5, kv. 71; Jury S. Popov, ulitsa Bariernaya, 16, kv. 14, Novosibirsk; Iosif F. Filippov, ulitsa Pulkovskogo, 17, kv. 39, Leningrad; Garry M. Khutoretsky, ulitsa Altaiskaya, 20, kv. 5, Leningrad; Jury N. Vvedensky, Ligovsky prospekt, 275, kv. 11, Leningrad; Jury V. Skachkov, Nevsky prospekt, 125, kv. 13, Leningrad, all of U.S.S.R.

[21] Appl. No.: 944,203

[22] Filed: Sep. 20, 1978

[51] Int. Cl.³ ............................................... H02K 9/00
[52] U.S. Cl. ....................................... 310/64; 310/261; 165/89
[58] Field of Search ................. 310/10, 40, 52, 54, 310/261, 64, 65; 165/89, 90

[56] References Cited

U.S. PATENT DOCUMENTS

| 3,648,082 | 3/1972 | MacNab | 310/54 |
| 3,679,920 | 7/1972 | MacNab | 310/10 |
| 3,729,640 | 4/1973 | Ross | 310/52 |
| 3,816,780 | 6/1974 | Smith | 310/52 |
| 4,079,273 | 3/1978 | Lambrecht | 310/52 |
| 4,085,343 | 4/1978 | Hasegawa | 310/52 |

Primary Examiner—R. Skudy
Attorney, Agent, or Firm—Lackenbach, Lilling & Siegel

[57] ABSTRACT

A rotor of an electrical machine has a superconducting winding which is connected to a heat exchanger in the cavity of the rotor. The heat exchanger feeds coolant to and withdraws coolant from the rotor. A thermal/electromagnetic shield, radially spaced from the superconducting winding, is connected with a Ranque vortex tube disposed in the cavity of the rotor. The rotor also has power leads having cooling ducts connected to the Ranque vortex tube and to the coolant discharge line. In addition, the rotor has two reducer portions adjacent the superconducting winding, arranged in series along the axis of the rotor on either side of the superconducting winding and each having a cooling duct located in close proximity to the superconducting winding and connected to Ranque vortex tube. The outlets of the cooling ducts of the reducer portions are connected with the coolant discharge line. The Ranque vortex tube is connected with the coolant supply line, while the outlet of the cooling duct of the thermal/electromagnetic shield is connected to the cooling duct of the reducer portions.

10 Claims, 6 Drawing Figures

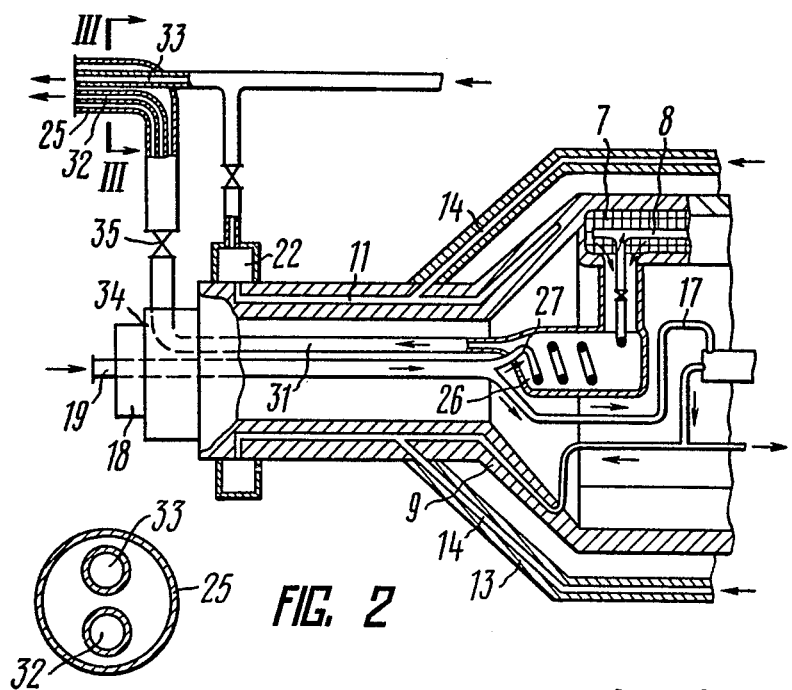
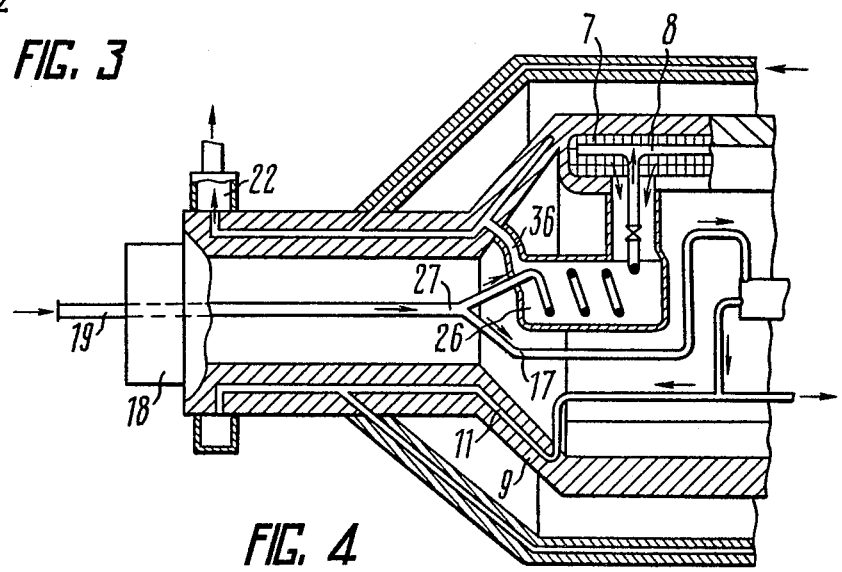
FIG. 2
FIG. 3
FIG. 4

ELECTRICAL MACHINE WITH CRYOGENIC COOLING

FIELD OF THE INVENTION

The invention relates to electrical machines, and more particularly to electrical machines with cryogenic cooling, including electric motors, generators and dynamotors applicable for use at atomic and thermal power stations and for transport and aviation uses as well. Other applications are concerned with space power systems and with systems in which a rotatable element, for example, an electric winding, is to be maintained in a condition determined by cryogenic cooling.

There is a great variety of electrical machines in which a rotatable electric winding is cooled down to cryogenic temperature. These electrical machines can be modified in the following manner. Firstly, the specialists seek to achieve a reduced power necessary for cryogenic cooling with the result that a maximum efficiency of the machines is obtained. Secondly, an attempt is made to enhance the overall reliability of the machines which is impaired when they are used in conjunction with cryogenic devices not provided with special-purpose facilities.

However, the modifications according to the first method can be related to those dealing with the enhancement of the operational reliability of the machines obtainable at the same power requirements since the amount of the power saved in the second case can be used to reduce the temperature of the superconducting winding.

Physically, the cryogenic cooling of the rotor winding is a procedure during which a coolant tends to cool the winding itself and the middle cylindrical portion of the rotor in which the winding is fixed; to cool the two reducer portions of the rotor which serve to connect immovably the central portion of the rotor with its neck portions rotatably mounted in the bearings; and to cool the power leads and the thermalelectromagnetic shield.

Known in the art is an electrical machine with cryogenic cooling (cf. an article by T. E. Laskaris, Cryogenics, Vol. 17, No. 4, April, 1977) in which a cryogenic system as a whole is positioned outside of the rotor and a coolant, whose temperature is as low as possible, is led into the rotor via a coolant supply duct and is used to cool down the rotor elements at temperatures differing from optimum ones, the coolant being discharged via one or two coolant discharge ducts.

A more optimum cooling system, defined in terms of power requirements and therefore providing a maximum efficiency of the machine, is a system with which an optimum cooling of each of the above-mentioned elements of the rotor is attained. This means that the coolant passing through the cooling ducts of each element must be consumed on an independent basis at a temperature which is an optimum one for the element. If the cryogenic system and the rotor are mounted separately from each other, the coolant must be fed to and withdrawn from the rotor through a plurality of ducts. For example, the four rotor elements described above must be served independently by four supply ducts and four discharge ducts.

Such a design is a sophisticated one and is difficult to construct. Known in the art is a more advantageous electrical machine with cryogenic cooling (cf. Great Britain Pat. No. 1,320,342, cl. H2A) in which part of the cryogenic system is disposed in the rotor cavity to provide for an almost optimum cooling and in which one duct is used to feed the coolant to the rotor and another duct serves to remove the coolant from the rotor.

In the described machine, the rotor comprises a superconducting winding with cooling ducts whose inlets and outlets are arranged to communicate, respectively, with the first outlet and the first inlet of a heat exchanger disposed in the rotor cavity, said heat exchanger being provided with a second inlet and a second outlet connected, respectively, with a line to feed the coolant to the rotor and with a line to withdraw the coolant from the rotor, a thermal/electromagnetic shield disposed in a radially spaced relationship from the superconducting winding and provided with at least one cooling duct whose inlet and outlet communicate, respectively with the coolant feed line and the coolant discharge line, two power leads electrically coupled to the superconducting winding, each provided with at least one cooling duct which has its inlet and outlet connected, respectively, with the coolant feed line and the coolant discharge line, and two reducer portions adjacent the superconducting winding, arranged in a serial fashion along the axis of the rotor on either side of the superconducting winding and each having at least one cooling duct which has its inlet located in close proximity to the superconducting winding and connected with the coolant feed line, and has its outlet coupled to the coolant discharge line.

Disposed in the rotor cavity is an expander in which the coolant led from the coolant feed line is cooled and is then delivered to that inlet of the heat exchanger which is connected with the coolant feed line. The presence of the expander in the rotor cavity tends to reduce the reliability of the machine since that expander has a movable element responsible for an increase in possible number of faults of the machine.

SUMMARY OF THE INVENTION

An object of the invention is to provide an electrical machine with cryogenic cooling, which offers higher reliability.

There is disclosed an electrical machine with cryogenic cooling, comprising a rotor which incorporates a superconducting winding with cooling ducts having its inlet and outlets communicating, respectively, with a first outlet and a first inlet of a heat exchanger disposed in the cavity of the rotor, a second inlet and a second outlet of the heat exchanger being connected, respectively, with a line to feed the coolant to the rotor and with a line to withdraw the coolant from the rotor, a thermal/electromagnetic shield disposed in a radially spaced relationship from the superconducting winding and provided with at least one cooling duct which has its inlet and outlet coupled, respectively, with the coolant supply line and the coolant discharge line, two power leads electrically coupled to the superconducting winding and each provided with at least one cooling duct which has its inlet and outlet connected, respectively, with the coolant supply line and the coolant discharge line, and two reducer portions adjacent the superconducting winding, arranged in a serial fashion along the axis of the rotor on either side of the superconducting winding and each having at least one cooling duct which has its inlet located in close proximity to the superconducting winding and connected with the coolant supply line, and has its outlet connected to the coolant discharge line, which machine further comprises, according to the invention, a Ranque vortex tube disposed in the cavity of the rotor, said Ranque vortex tube has its tangential inlet connected with the coolant supply line, has its central outlet connected with the inlets of the cooling ducts of the reducer portions and power leads and, has its peripheral outlet connected with the inlet of cooling duct of the thermal/electromagnetic shield which has its outlet connected with an additional inlet of the cooling duct of at least one of the reducer portions.

Advantageously, the coolant discharge line comprises two ducts, that outlet of the heat exchanger which is on the side of the coolant discharge line being connected with the first one of the ducts, and the outlets of the cooling ducts of the reducer portions being connected with the second duct.

Preferably, the outlet of the heat exchanger connected with the coolant discharge line is connected with the additional inlet of the cooling duct of at least one of the reducer portions.

It is advantageous that the Ranque vortex tube is disposed in a chamber which is arranged in the heat exchanger.

It is preferable that the tangential inlet of the Ranque vortex tube is connected with an additional outlet of the heat exchanger.

DESCRIPTION OF THE DRAWINGS

The invention will now be described, by way of example, with reference to the accompanying drawings in which:

FIG. 2 is a partial longitudinal section of the electrical machine with cryogenic cooling, showing a two-duct line to withdraw the coolant from the rotor and the connections of the line with the cooled elements of the rotor, according to the invention;

FIG. 3 is a section along line III—III on FIG. 2, according to the invention;

FIG. 4 is a partial longitudinal section of the electrical machine with cryogenic cooling, having its heat exchanger connected with the additional inlets of the cooling ducts of the reducer portions, according to the invention;

DESCRIPTION OF THE INVENTION

Figure 1:
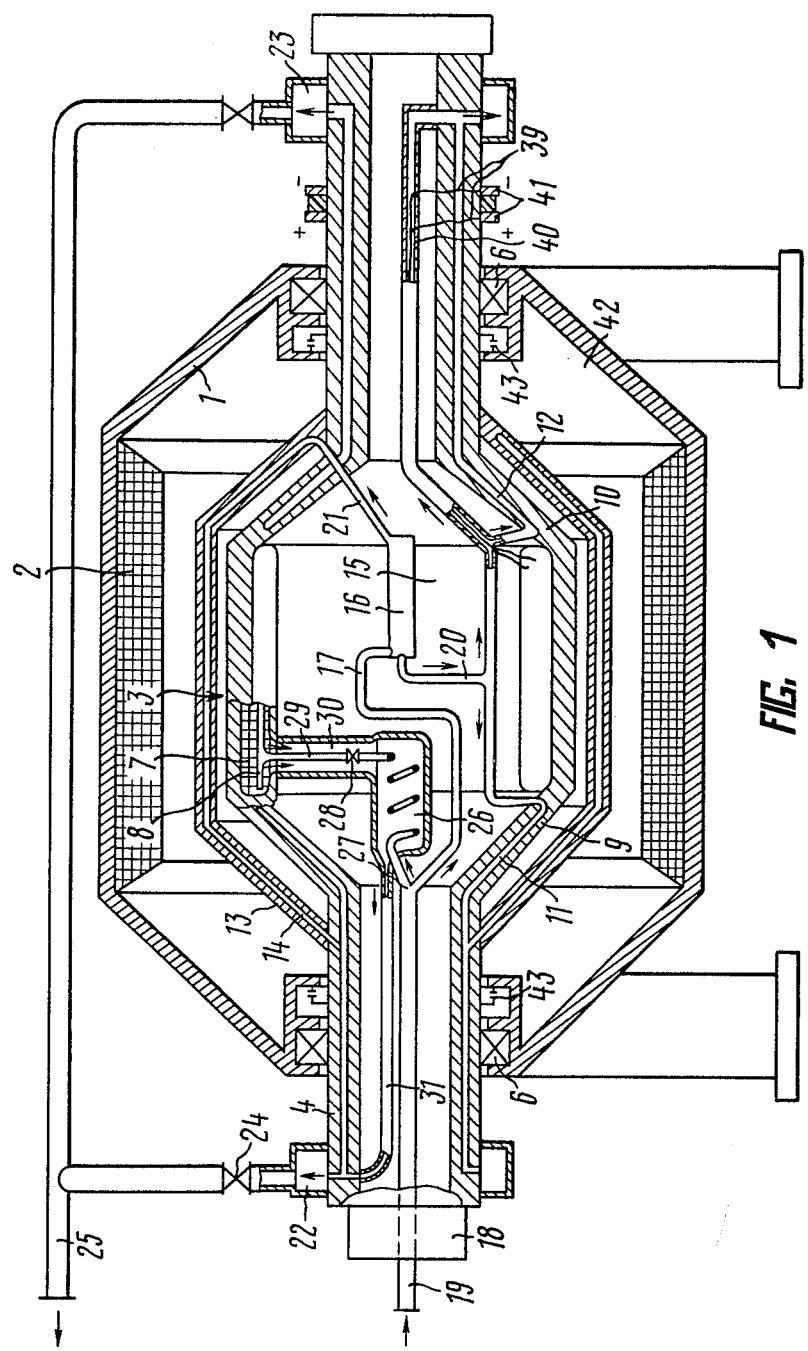
FIG. 1 is a partial longitudinal section of an electrical machine with cryogenic cooling, according to the invention.

The electrical machine with cryogenic cooling according to the invention comprises a stator body 1 (FIG. 1) in which a stator winding 2 is rigidly fixed and which incorporates a hollow rotor 3 having its ends 4 and 5 rotatably mounted in bearings 6. The middle cylindrical portion of the rotor 3 attaches a superconducting winding 7 with cooling ducts 8 (only one duct is shown for the convenience of the reader). Two reducer portions 9 and 10 are adjacent to the superconducting winding 7 and are arranged in serial fashion along the axis of the rotor 3 on either side of the superconducting winding 7. In each of the reducer portions 9 and 10 there is provided at least one cooling duct, namely, annular ducts 11 and 12, respectively, according to the described embodiment of the invention. The inlets of the annular ducts 11 and 12 are located in closed proximity to the superconducting winding 7 of the rotor 3.

The rotor 3 also comprises a thermal/electromagnetic shield 13 disposed in a radially spaced relationship from the superconducting winding 7. The shield 13 is rigidly fixed to the reducer portions 9 and 10 and is designed to protect the superconducting winding 7 from thermal radiation and the alternating component of the magnetic field, both produced by the stator winding 2. At least one cooling duct, an annular cooling duct 14 according to the given embodiment of the invention, is formed in the shield 13.

A cavity 15 of the rotor 3 houses a Ranque vortex tube 16 whose tangential inlet communicates, via a piping 17, with the rotatable element of an assembly 18 to supply the coolant to the rotor 3, which assembly 18 has its immovable element connected with a line 19 to feed the coolant to the rotor 3. The central outlet of the Ranque vortex tube 16 is connected, via a piping 20, to the inlet of the annular cooling ducts 11, 12 of the reducer portions 9, 10, respectively. The peripheral outlet of the Ranque vortex tube 16 communicates, via a piping 21, with the inlet of the annular cooling duct 14 of the shield 13. The outlet of the annular cooling duct 14 communicates with the second inlet of the cooling duct of at least one of the reducer portions, namely, with the second inlet of the annular cooling duct 11 of the reducer portion 9.

The annular cooling ducts 11, 12 communicate, via radial ducts, with gas traps 22, 23, respectively, which are connected, via control valves 24, with a line 25 to withdraw the coolant from the rotor 3. The gas traps 22, 23 are immovable ones and the clearances between their walls and the rotor 3 are made hermetically sealed with the help of gaskets (not shown).

The cavity 15 of the rotor 3 also houses a heat exchanger, namely, a recuperative heat exchanger 26 according to the given embodiment of the invention. The recuperative heat exchanger 26 has its first inlet (on the heat-emitting side) connected, via the piping 27, to the rotatable element of the coolant supply assembly 18 which has its immovable element connected with the coolant supply line 19. The recuperative heat exchanger 26 has its first outlet (on the heat-emitting side) connected to the inlets of the cooling ducts 8 of the superconducting winding 7 via a throttle 28 and a piping 29. There is a piping 30, intended to withdraw the evaporated coolant from the superconducting winding 7. The piping 30 connects the outlets of the cooling ducts 8 with a second inlet (on the heat-absorbing side) of the recuperative heat exchanger 26 having its second outlet (on the heat-absorbing side) connected, via a piping 31, with the gas trap 22 and, via the latter, with the coolant discharge line 25.

Another embodiment of the invention is provided in which the coolant is withdrawn from the rotor 3 and is led to a cryogenic installation (not shown). In this embodiment, the coolant discharge line 25 (FIGS. 2, 3) has two ducts, namely, pipings 32 and 33. The piping 31 (FIG. 2) connects the outlet of the recuperative heat exchanger 26, via an assembly 34 to withdraw the coolant from the rotor 3 and via a control valve 35, to the piping 32. The annular duct 11 (FIG. 1) of the reducer portion 9 and the annular duct 12 of the reducer portion 10 are connected with the piping 33 (FIG. 2).

In order to reduce thermodynamic losses occuring in mixing two flows of the coolant with different temperatures, one (being hot) which passes from the recuperative heat exchanger 26 (FIG. 1) and one passing through the annular duct 11 of the reducer portion 9, it is good practice to mix these flows at that point of the annular duct 11 where the both flows have the same temperature. To this end, the outlet of the recuperative heat exchanger 26 (FIG. 4) is connected with the second inlet of the cooling duct of at least one of the reducer portions via a piping 36, namely, with the second inlet of the annular duct 11 of the reducer portion 9 according to the described embodiment of the invention.

Figure 5:
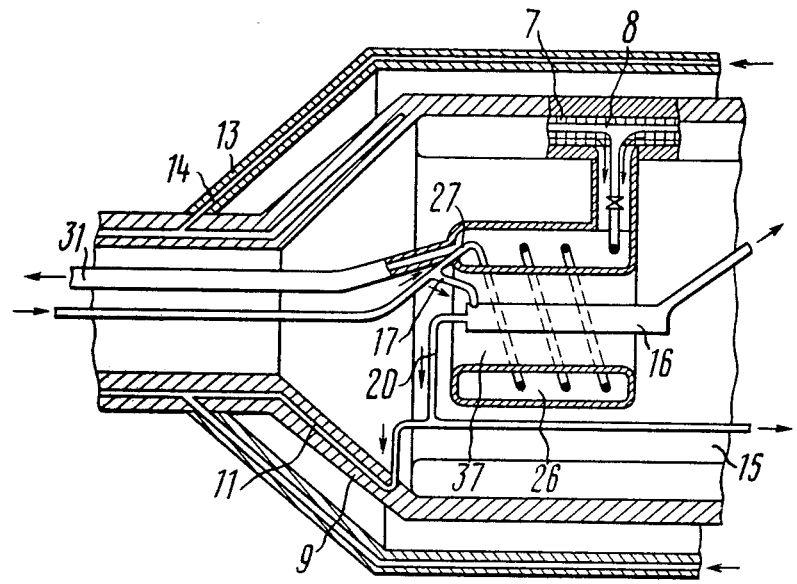
FIG. 5 is a partial longitudinal section of the electrical machine with cryogenic cooling, showing a spatially combined arrangement of the heat exchanger and the Ranque vortex tube, according to the invention.

To reduce the size of the rotor 3 in its axial direction, it is possible to spatially combine the recuperative heat exchanger 26 with the Ranque vortex tube 16. In this case, the recuperative heat exchanger 26 (FIG. 5) has a chamber 37 which communicates with the cavity 15 of the rotor 3, the Ranque vortex tube 16 being disposed within the chamber 37.

Figure 6:
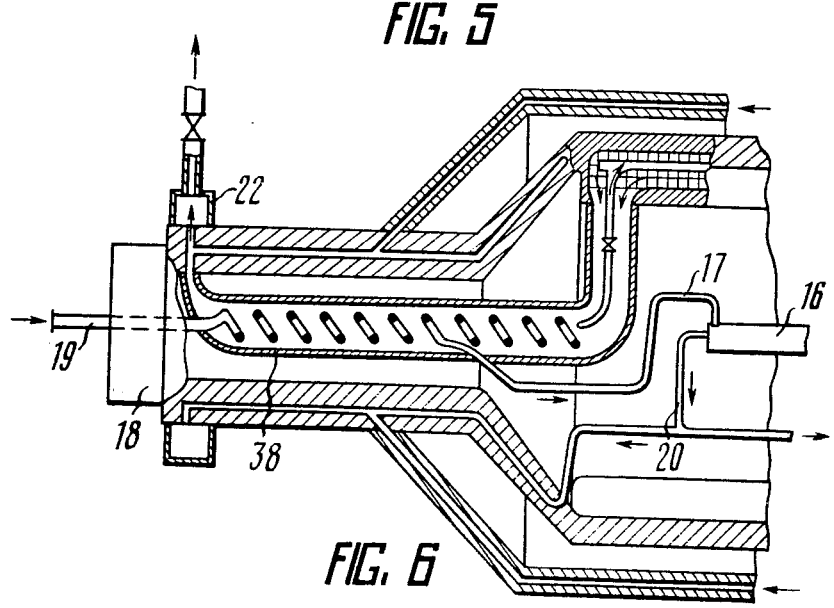
FIG. 6 is a partial longitudinal section of the electrical machine with cryogenic cooling in which the additional outlet of the heat exchanger is connected with the inlet of the Ranque vortex tube, according to the invention.

To provide for increased operational reliability of the coolant supply assembly 18 (FIG. 6), the temperature of the coolant in the coolant supply line 19 can be raised due to recuperative heat exchange between the incoming and outgoing flows. This is achieved by means of an arrangement in which the tangential inlet of the Ranque vortex tube 16 is connected, via the piping 17, with the third outlet of a recuperative heat exchanger 38, which is the second outlet on the heat-emitting side.

The superconducting winding 7 (FIG. 1) of the rotor 3 is electrically coupled to two power leads 39 each having at least one cooling duct. In the described embodiment, the power leads 39 are located in a common cooling duct which is a piping 40 having its inlet connected with the central outlet of the Ranque vortex tube 16, and having its outlet connected, via the gas trap 23 and the control valve 24, with the coolant discharge line 25. Each power lead 39 is coupled to a respective slip ring 41.

In the described embodiment, the cavity 15 of the rotor 3 and a cavity 42 of the stator are maintained in a vacuum condition and the cavity 42 has a vacuum-tight gasket 43 for the purpose.

The direction in which the coolant passes is shown by respective arrows in FIGS. 1, 2, 4, 5, 6.

The required temperature of the superconducting winding 7 (FIG. 1) is maintained in the following manner. The superconducting winding 7 is cooled by a liquid coolant, for example, helium, while a gaseous coolant is used to cool down the following elements of the rotor 3: reducer portions 9, 10, power leads 39 and thermal/electromagnetic shield 13.

The coolant under a pressure corresponding to the maximum pressure in the cryogenic installation is led from the coolant supply line 19 to the rotor 3 via the coolant supply assembly 18 at a temperature which provides for the liquefaction of the coolant in the course of its further cooling in the recuperative heat exchanger 26 and in the throttle 28. When introduced into the rotor 3, the coolant is divided into two flows as shown by the arrows in FIGS. 1, 2, 4, 5. One flow of the coolant is delivered into the tangential inlet of the Ranque vortex tube 16 via the piping 17, whereas the other flows into the recuperative heat exchanger 26 via the piping 27. In the Ranque tube 16, the incoming flow is divided, in turn, into two flows. One of the latter, when cooled down to a temperature lower than that of the flow at the tangential inlet of the Ranque vortex tube 16, is led via the central outlet and via the piping 20 to pass into the annular cooling ducts 11, 12 of the reducer portions 9, 10 and into the piping 40 which houses the power leads 39.

The second flow obtained in the Ranque vortex tube 16 is passed, at a temperature greater than that of the first flow obtained in that tube 16, via the peripheral outlet of the Ranque vortex tube 16 and via the piping 21 to the annular cooling duct 14 of the thermal/electromagnetic shield 13. After heating in the shield 13, the coolant is delivered to the second inlet of the annular cooling duct 11 of the reducer portion 9. The flows of the coolant so combined are led from the rotor 3 into the gas trap 22 (FIGS. 1, 2, 4, 6), whereas the flow from the annular cooling duct 12 (FIG. 1) of the reducer portion 10 as well as from the piping 40 is delivered to the gas trap 23. After passage through the gas traps 22, 23, the coolant enters the coolant discharge line 25 via the control valves 24.

The manner in which the Ranque vortex tube 16 is connected with the electrical machine with cryogenic cooling is advantageous since the latter has the thermal/electromagnetic shield 13 for which an adequate thermodynamic cooling is attained in the case of its coolant flow having a temperature greater than that of the coolant flow used for the cooling of the reducer portions 9, 10. The Ranque tube 16 provides for the required division of the coolant into these two flows.

The coolant flow introduced into the recuperative heat exchanger 26 from the coolant supply assembly 18 is cooled by a heat-absorbing flow led from the cooling ducts 8 of the superconducting winding 7. The vapor-liquid mixture obtained after the passage of the heat-emitting coolant flow through the throttle 28 is divided into a vapor and a liquid under the influence of the centrifugal forces resulted from the rotation of the rotor 3. Note that the device to separate the vapor-liquid mixture as well as respective ducts in the superconducting winding 7 are not shown in the drawings. The vapor passes into the piping 30 while the liquid is delivered into the cooling ducts 8 of the superconducting winding 7 and is converted to vapor led into the piping 30, too. After passage through the piping 30, the vapor enters the recuperative heat exchanger 26 and passes through the latter so that the forward coolant flow is cooled and the vapor itself is heated. The vapor then passes via the piping 31 into the gas trap 22 and finally enters the coolant discharge line 25, An optimum thermodynamic condition is achieved when the coolant flow from the recuperative heat exchanger 26 is led via the piping 31 and via the coolant discharge assembly 34 (FIG. 2) into the piping 32 of the coolant discharge line 25. In this case, the coolant flow passed into the gas traps 22, 23 (FIG. 1) from the annular cooling ducts 11, 12 of the reducer portions 9, 10 enters the piping 33 (FIG. 2) of the coolant discharge line 25. After that, the above coolant flows from the pipings 32, 33 enter respective external stages of the cryogenic installation.

The temperature at which the heat-absorbing coolant flow at the outlet of the recuperative heat exchanger 26, that has been heated up under the influence of the heat-emitting flow during the recuperative heat exchange, may differ considerably from the temperature of the coolant flow delivered to the coolant discharge line 25 from the annular cooling ducts 11, 12 (FIG. 1) of the reducer portions 9, 10. The mixing of the flows maintained at different temperatures results in thermodynamic loss occurred in the cryogenic cooling system and therefore in a reduced efficiency of the electrical machine. This holds true if the machine efficiency is calculated on an assumption that the power loss related to the machine includes the amount of the power consumed by cryogenic cooling of its superconducting winding.

According to the above assumption, a separate discharge of the two flows results in a greater refrigerating capacity of the cryogenic installation, in a greater amount of the liquid coolant and in a lower temperature of the latter, thereby providing for more reliable operation of the electrical machine with cryogenic cooling.

The heat-absorbing flow of the coolant, after it has been heated up in the recuperative heat exchanger 26, can be passed into the annular cooling duct 11 of the reducer portion 9 (FIG. 4) in which case it does not enter in a direct way the gas traps 22, 23 (FIG. 1). This provides for a greater flow rate as related to the annular cooling duct 11 and for better cooling of the reducer portions 9, 10, in comparison to direct discharge to the gas traps 22, 23. In addition, such an embodiment requires a smaller number of the gas traps of the machine, which results in higher reliability of the machine as a whole.

The spatially combined arrangement of the Ranque vortex tube (FIG. 5) with the recuperative heat exchanger 26 is attained without changing the distribution of the coolant flows in the cryogenic cooling system of the electrical machine. This leads to a reduced distance between the supports of the rotor 3 (FIG. 1), which also ensures higher reliability of the machine.

The temperature at which the coolant entering the rotor 3 is maintained can be increased with the help of the recuperative heat exchanger 38 (FIG. 6) which can be treated as a two-stage heat exchanger in terms of recuperative heat exchange. An increase in the temperature of the coolant in the coolant supply line 19 is provided by the second stage (as viewed along the direction of the heat-absorbing flow of the coolant) of the recuperative heat exchanger 38. This stage is obtained by virtue of the third outlet of the heat exchanger 38, connected with the tangential inlet of the Ranque vortex tube 16.

The increased temperature of the flow of the coolant through the coolant supply assembly 18 provides for higher reliability of the latter, which, in turn, ensures higher reliability of the machine as a whole.

To provide for good thermal insulation between the elements of the rotor 3 (FIG. 1) as well as between the rotor 3 and the stator, the cavity 15 of the rotor 3 and the cavity 42 of the stator are maintained in a vacuum condition. A vacuum is maintained with the help of the vacuum-tight gaskets 43 and continuously operated vacuum pumps (not shown). The pipings 32 (FIGS. 2, 3) and 33 in the coolant discharge line 25 must be thermally insulated from each other, too.

What is claimed is:

1. An electrical machine with cryogenic cooling, comprising:
   a stator;
   a body of said stator;
   a winding of said stator disposed within said body;
   a hollow rotor disposed in said body of said stator;
   a superconducting winging of said rotor;
   cooling ducts of said superconducting winding of said rotor;
   a heat exchanger disposed in said hollow rotor, provided with an inlet and an outlet on the heat-emitting side and with an inlet and an outlet on the heat-absorbing side, and connected, via said inlet on the heat-absorbing side and via said outlet on the heat-emitting side, with said cooling ducts of said superconducting winding;
   a line to feed the coolant to said rotor, connected with said inlet on the hot side of said heat exchanger;
   a line to withdraw the coolant from the rotor, connected, with said outlet on said cold side of said heat exchanger;
   a thermal electromagnetic shield of said rotor, arranged in a radially spaced relationship from said superconducting winding of said rotor;
   two power leads of said rotor, electrically coupled to said superconducting winding of said rotor;
   at least one cooling duct of said power leads, connected with said coolant discharge line;
   two reducer portions of said rotor, adjacent said superconducting winding, arranged in a serial fashion along the axis of said rotor on either side of said superconducting winding;
   at least one cooling duct of each of said reducer portions, provided with a first inlet located in close proximity to said winding and an outlet connected with said outlet of said coolant discharge line;
   a Ranque vortex tube disposed in said hollow rotor and having a tangential inlet, a central outlet and a peripheral outlet, said Ranque vortex tube having said tangential inlet connected with said coolant supply line, having said central outlet connected with said first inlet of said cooling ducts of said reducer portions and with said cooling duct of said power leads;
   a second inlet of said cooling duct of at least one of said reducer portions of said rotor;
   at least one cooling duct of said thermal/electromagnetic shield, connected with said peripheral outlet of said Ranque vortex tube and said second inlet of said cooling duct of at least one of said reducer portions.

2. An electrical machine with cryogenic cooling as claimed in claim 1, comprising:
   two ducts of said coolant discharge line;
   said heat exchanger connected, via said outlet on the heat-absorbing side, with said first duct of said coolant discharge line;
   said reducer portions having said outlets of said cooling ducts connected with said second duct of said coolant discharge line.

3. An electrical machine with cryogenic cooling as claimed in claim 1, comprising:
   a third inlet of said cooling duct of at least one of said reducer portions;
   said heat exchanger connected, via said outlet on the heat-absorbing side, with said third inlet of said cooling duct of at least one of said reducer portions.

4. An electrical machine with cryogenic cooling as claimed in claim 1, comprising:
   a chamber formed within said heat exchanger;
   said Ranque vortex tube disposed in said chamber.

5. An electrical machine with cryogenic cooling as claimed in claim 1, comprising:

said heat exchanger having a second outlet on the heat-emitting side, connected with said tangential inlet of said Ranque vortex tube.

6. An electrical machine with cryogenic cooling as claimed in claim 2, comprising:
 a chamber formed within said heat exchanger;
 said Ranque vortex tube disposed in said chamber.

7. An electrical machine with cryogenic cooling as claimed in claim 2, comprising:
 said heat exchanger having a second outlet on the heat-emitting side, connected with said tangential inlet of said Ranque vortex tube.

8. An electrical machine with cryogenic cooling as claimed in claim 3, comprising:
 a chamber formed within said heat exchanger; said Ranque vortex tube disposed within said chamber.

9. An electrical machine with cryogenic cooling as claimed in claim 3, comprising:
 said heat exchanger having a second outlet on the hot side, connected with said tangential inlet of said Ranque vortex tube.

10. An electrical machine with cryogenic cooling as claimed in claim 4, comprising:
 said heat exchanger having a second outlet on the hot side, connected with said tangential inlet of said Ranque vortex tube.

* * * * *